US012447650B2

(12) United States Patent
Karau

(10) Patent No.: US 12,447,650 B2
(45) Date of Patent: Oct. 21, 2025

(54) MANUFACTURED RETAINING WALL BLOCK WITH IMPROVED FALSE JOINT

(71) Applicant: PAVESTONE, LLC, Atlanta, GA (US)

(72) Inventor: William H. Karau, Blanco, TX (US)

(73) Assignee: PAVESTONE, LLC, Atlanta, GA (US)

( * ) Notice: Subject to any disclaimer, the term of this patent is extended or adjusted under 35 U.S.C. 154(b) by 0 days.

(21) Appl. No.: 18/497,326

(22) Filed: Oct. 30, 2023

(65) Prior Publication Data
US 2024/0140003 A1    May 2, 2024

Related U.S. Application Data

(63) Continuation of application No. 17/346,785, filed on Jun. 14, 2021, now Pat. No. 11,801,622, which is a
(Continued)

(51) Int. Cl.
*B29C 41/36*    (2006.01)
*B28B 7/00*    (2006.01)
(Continued)

(52) U.S. Cl.
CPC .............. *B29C 41/36* (2013.01); *B28B 7/00* (2013.01); *B28B 7/007* (2013.01); *B28B 7/0097* (2013.01); *B28B 7/183* (2013.01); *B28B 7/28* (2013.01); *B28B 17/0027* (2013.01); *E02D 29/02* (2013.01); *E02D 29/025* (2013.01); *E02D 29/0266* (2013.01); *E04B 2/32* (2013.01); *E04C 1/00* (2013.01); *E04C 1/395* (2013.01);
(Continued)

(58) Field of Classification Search
CPC ... E02D 29/02; E02D 29/025; E02D 29/0266; E04B 2/32; E04B 2002/0208; E04B 2002/0219; E04B 2002/0269; E04C 1/00; E04C 1/395
See application file for complete search history.

(56) References Cited

U.S. PATENT DOCUMENTS 7,207,146 B1 *   4/2007   Morrell ................. B28B 7/0044
                                                       52/561
7,410,328 B2     8/2008   Hamel
(Continued)

FOREIGN PATENT DOCUMENTS

RU            2402661 C2     10/2010
WO          2010/069038       6/2010

*Primary Examiner* — Patrick J Maestri
(74) *Attorney, Agent, or Firm* — Jackson Walker LLP; Christopher J. Rourk

(57) ABSTRACT

A retaining wall block having a false joint and a system of retaining wall blocks. The retaining wall block includes a body having a first textured surface and a second textured surface and a false joint dividing the first and second textured surface. The false joint can have a depth divided by the width greater than two inches. The false joint can have an interior angle of less than ten degrees. The system includes a plurality of retaining wall blocks and a first course of retaining wall blocks engaged with a second course of retaining wall blocks below. Each block in the system comprising a front face having a first textured surface and a second textured surface and a false joint dividing the first and second textured surface. The false joint can extend a predetermined depth of a third surface.

13 Claims, 8 Drawing Sheets

Related U.S. Application Data continuation of application No. 16/812,851, filed on Mar. 9, 2020, now Pat. No. 11,034,062, which is a continuation of application No. 15/978,891, filed on May 14, 2018, now Pat. No. 10,583,588, which is a continuation-in-part of application No. 15/688,784, filed on Aug. 28, 2017, now Pat. No. 9,999,993, and a continuation-in-part of application No. 15/080,276, filed on Mar. 24, 2016, now abandoned, said application No. 15/688,784 is a continuation of application No. 15/074,830, filed on Mar. 18, 2016, now Pat. No. 9,744,697, said application No. 15/080,276 is a continuation-in-part of application No. 29/543,176, filed on Oct. 21, 2015, now Pat. No. Des. 791,346, said application No. 15/074,830 is a continuation of application No. 14/311,194, filed on Jun. 20, 2014, now abandoned.

(60) Provisional application No. 61/838,205, filed on Jun. 21, 2013.

(51) Int. Cl.
  *B28B 7/18* (2006.01)
  *B28B 7/28* (2006.01)
  *B28B 17/00* (2006.01)
  *E02D 29/02* (2006.01)
  *E04B 2/32* (2006.01)
  *E04C 1/00* (2006.01)
  *E04C 1/39* (2006.01)
  *E04B 2/02* (2006.01)

(52) U.S. Cl.
  CPC ............... *E04B 2002/0208* (2013.01); *E04B 2002/0219* (2013.01); *E04B 2002/0269* (2013.01)

(56) References Cited

U.S. PATENT DOCUMENTS

| | | | |
|---|---|---|---|
| 8,011,152 B2 | 9/2011 | Thomassen | |
| 2010/0043335 A1* | 2/2010 | O'Connor | E04B 2/26 52/592.6 |
| 2011/0078978 A1* | 4/2011 | Wauhop | B28B 11/0863 52/745.19 |
| 2018/0187405 A1 | 7/2018 | Hamel | |

* cited by examiner

MANUFACTURED RETAINING WALL BLOCK WITH IMPROVED FALSE JOINT

RELATED APPLICATIONS

The present application is a continuation of U.S. patent application Ser. No. 17/346,785, filed Jun. 14, 2021, which is a continuation of U.S. patent application Ser. No. 16/812,851, filed Mar. 9, 2020, now U.S. Pat. No. 11,034,062, issued on Jun. 15, 2021, which is a continuation of U.S. patent application Ser. No. 15/978,891, filed May 14, 2018, now U.S. Pat. No. 10,583,588, issued on Mar. 10, 2020, which is a continuation-in-part of U.S. patent application Ser. No. 15/688,784, filed Aug. 28, 2017, now U.S. Pat. No. 9,999,993, issued on Jun. 19, 2018, which is a continuation of U.S. patent application Ser. No. 15/074,830, filed Mar. 18, 2016, now U.S. Pat. No. 9,744,697, issued Aug. 29, 2017, which is a continuation of U.S. patent application Ser. No. 14/311,194, filed Jun. 20, 2014, which claims priority to U.S. Provisional Patent Application No. 61/838,205, filed on Jun. 21, 2013. U.S. patent application Ser. No. 15/978,891 is also a continuation-in-part of U.S. patent application Ser. No. 15/080,276, filed Mar. 24, 2016, which is a continuation in part of U.S. Design Application No. 29/543,176, filed Oct. 21, 2015, now U.S. Design Pat. No. D791,346, issued Jul. 4, 2017, which are hereby incorporated by reference for all purposes as if set forth herein in their entirety.

TECHNICAL FIELD

The present disclosure relates to retaining wall blocks, and more specifically to a retaining wall block having a false joint and a mold for manufacturing such.

BACKGROUND OF THE INVENTION

Retaining wall blocks can be manufactured and arranged in a variety of different ways.

SUMMARY OF THE INVENTION

A manufactured retaining wall block with an improved false joint and a system of retaining wall blocks with an improved false joint is presented herein.

In an embodiment, a retaining wall block having a false joint is presented. The retaining wall block comprises a body having a first surface and a second surface and a false joint dividing the first and second surface and extending a predetermined depth of the body.

In another embodiment, the first and second surface can be textured. The false joint can have a depth divided by the width that is less than a predetermined value. The false joint can also have an exterior angle that is greater than an interior angle. The retaining wall block can also include a base below the body that has at least one ridge to produce at least one engagement cavity. The body and the base can define an H-shaped dimension.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1A:
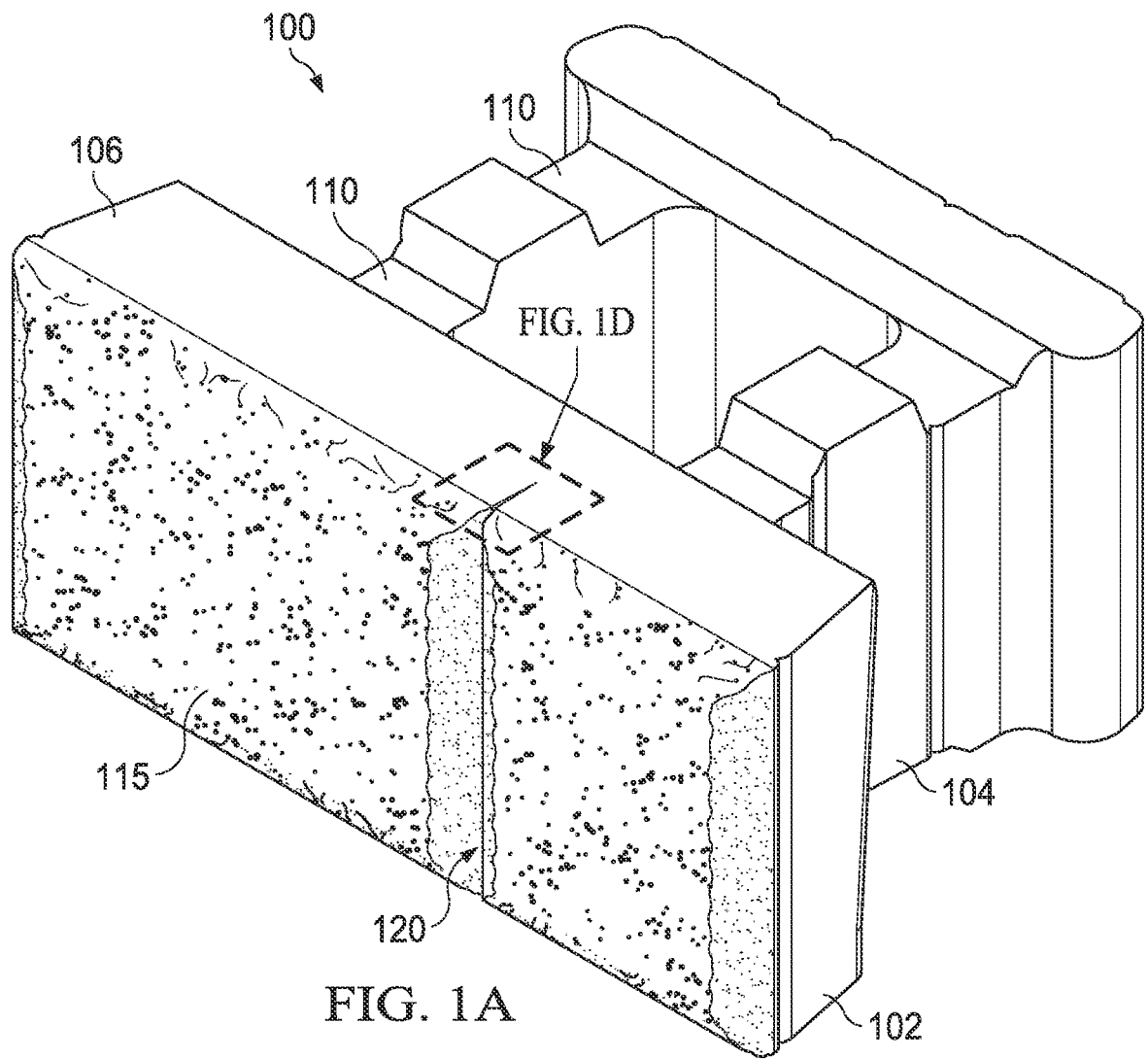
FIGS. 1A through 1D are diagrams of a retaining wall blocks with false joints in accordance with an example embodiment of the present disclosure.

In the description that follows, like parts are marked throughout the specification and drawings with the same reference numerals. The drawing figures might or might not be to scale and certain components can be shown in generalized or schematic form and identified by commercial designations in the interest of clarity and conciseness.

Figure 1B:
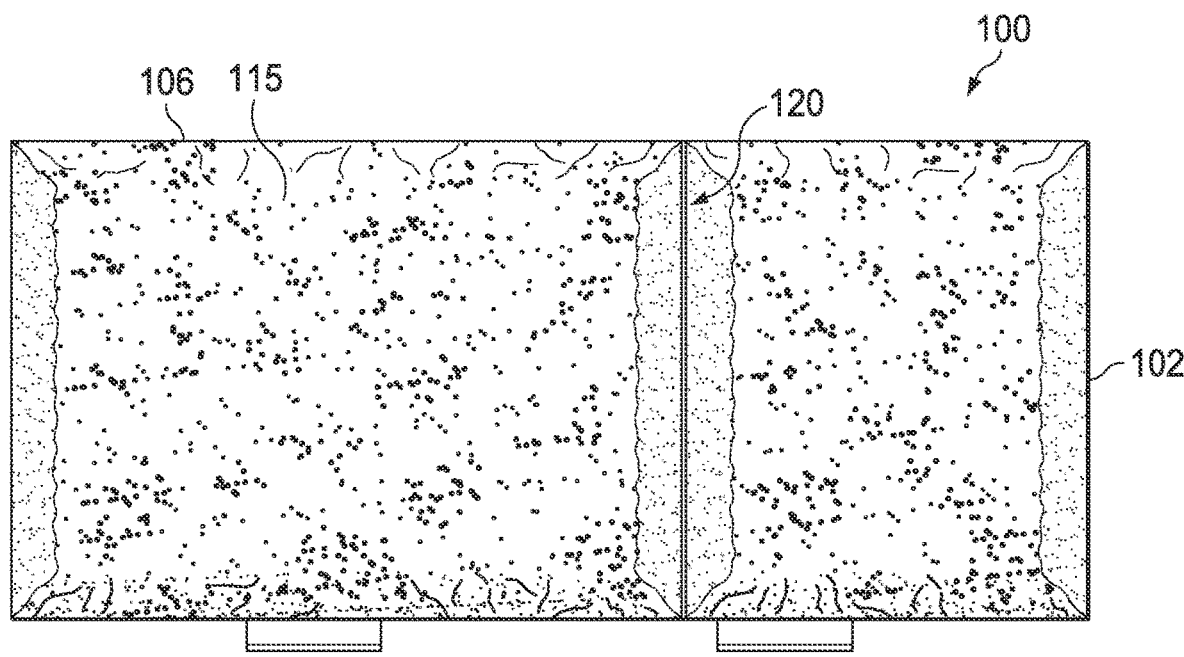
Figure 1C:
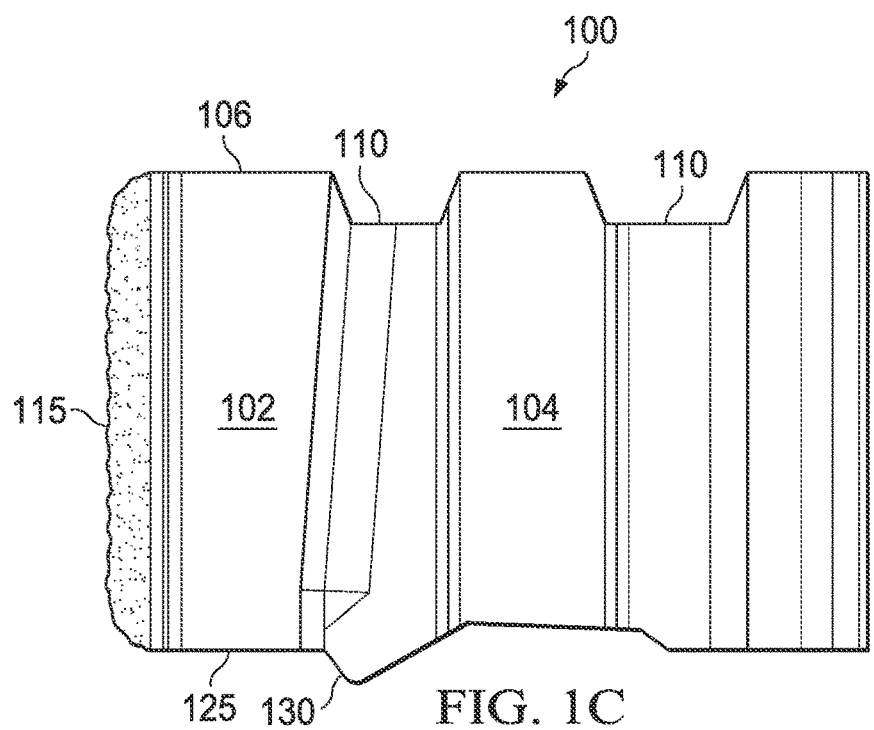

FIGS. 1A through 1C are diagrams of a retaining wall block 100 in accordance with an example embodiment of the present disclosure. Retaining wall block 100 can be formed from masonry, concrete or other suitable materials, using a wet cast process, a dry cast process or other suitable processes. As shown in FIG. 1A, retaining wall block 100 includes a body 102, a base 104, a top face 106, engagement cavity 110, and textured front face 115. Textured front face 115 can be formed by splitting retaining wall block 100 from a second retaining wall block 100, as discussed in greater detail below.

As shown in FIGS. 1A and 1B, front face 115 includes a false joint 120. The false joint 120 can extend the width of the body 102 along the front face 115 and a depth of the body 102. The false joint 120 can be located anywhere along the front face 115 of the body 102 and can be extended to different depths of the body 102. As is more clearly shown in FIG. 1D, the false joint 120 can have an exterior false joint section having an apparent angle β and an interior false joint section having an apparent angle α. The false joint 120 can have an interior false joint width W and an interior false joint depth D and a depth divided by width (D/W) of greater than a predetermined amount, such as 2 to 3, depending on the size of the body 102, or other suitable amounts. The width W can be equal to or less than 3 mm or other suitable values. The false joint 120 can have a depth of about a third of the depth of the body 102, or other suitable depths. The apparent angle α of false joint 120 can range from less than 10° to greater than 20°, and the apparent angle β of false joint 120 can range from less than 60° to greater than 80°. A transition region between the interior false joint section and the exterior false joint section can have a thickness t, where t can be less than or equal to a predetermined value, such as 8 mm, or other suitable values. Furthermore, the body 102 can include multiple false joints 120. Alternate interior and exterior portions are shown as alternatives.

As shown in FIG. 1C, which is a side view of retaining wall block 100, retaining wall block 100 can also include a bottom surface 125 having at least one engagement protrusion 130. Engagement protrusion 130 is configured to interface with engagement cavity 110 of an underlying retaining wall block 100. Furthermore, the front engagement cavity 110 is offset from the location of engagement protrusion 130, so as to result in a staggered incline as successive rows of retaining wall blocks 100 are formed. In one embodiment of the present disclosure, the incline of successive rows of retaining wall blocks 100 is generally vertical with no staggering.

Figure 2A:
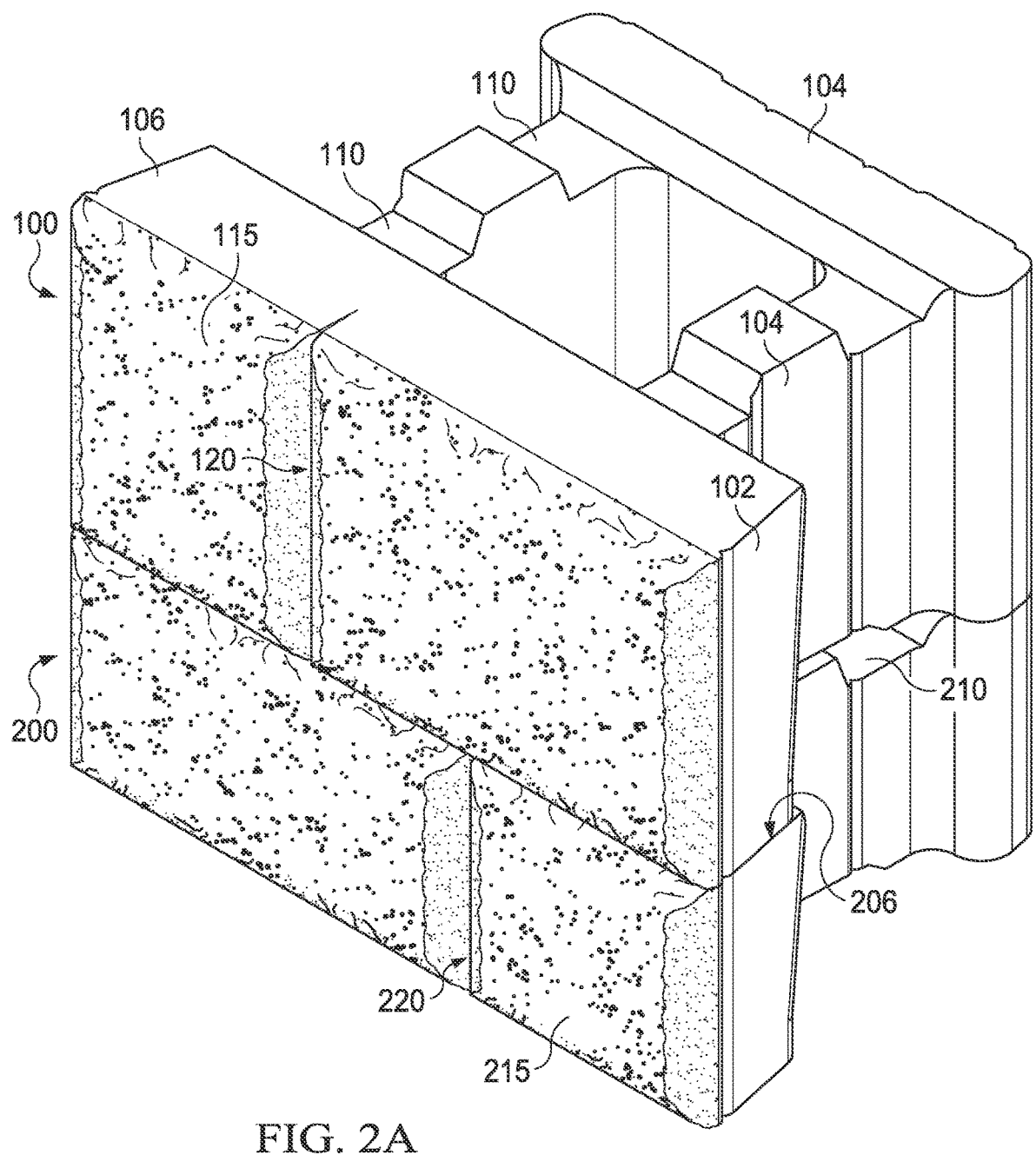
FIGS. 2A through 2C are diagrams of engaged retaining wall blocks with false joints in accordance with an example embodiment of the present disclosure.
Figure 2B:
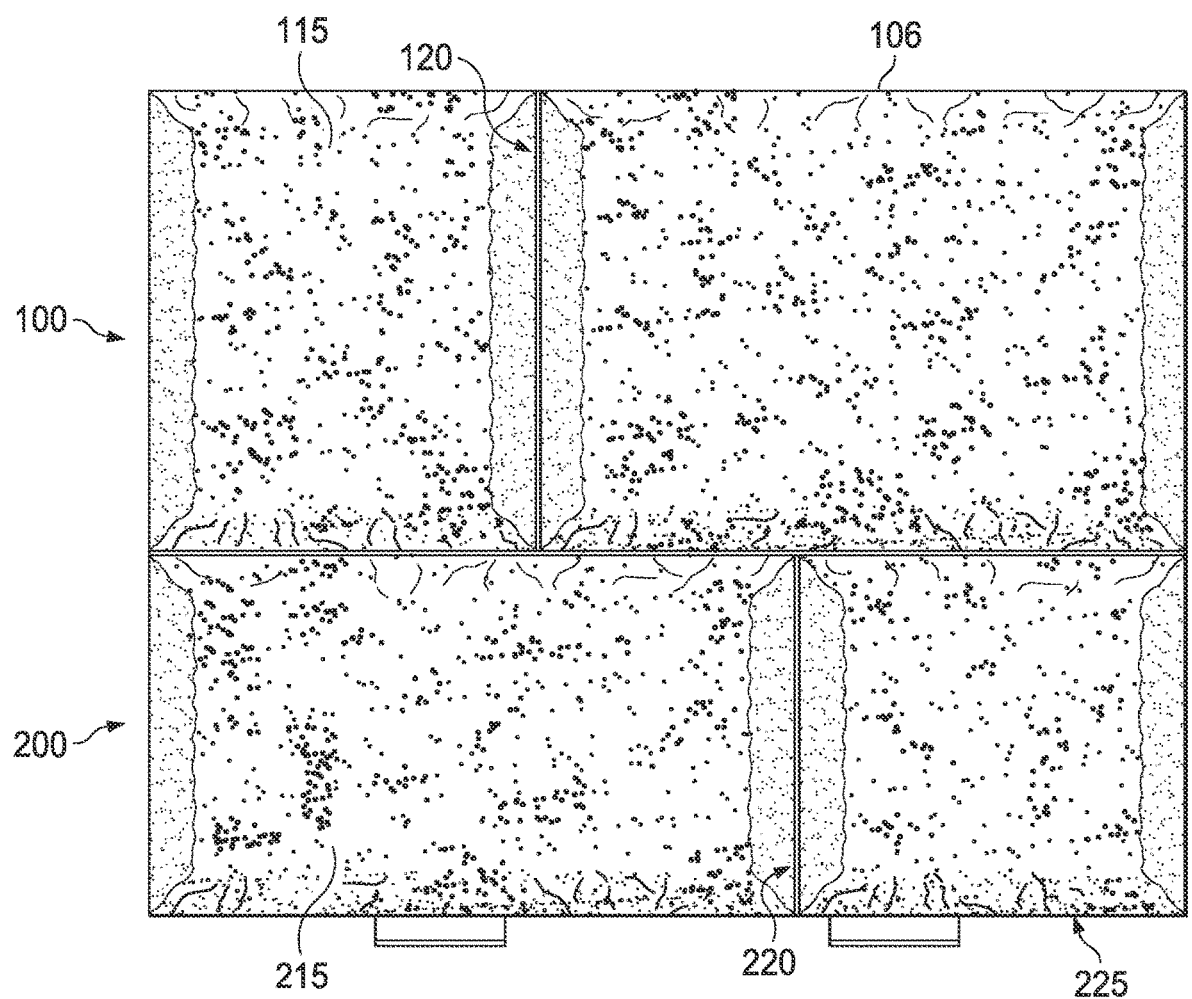
Figure 2C:
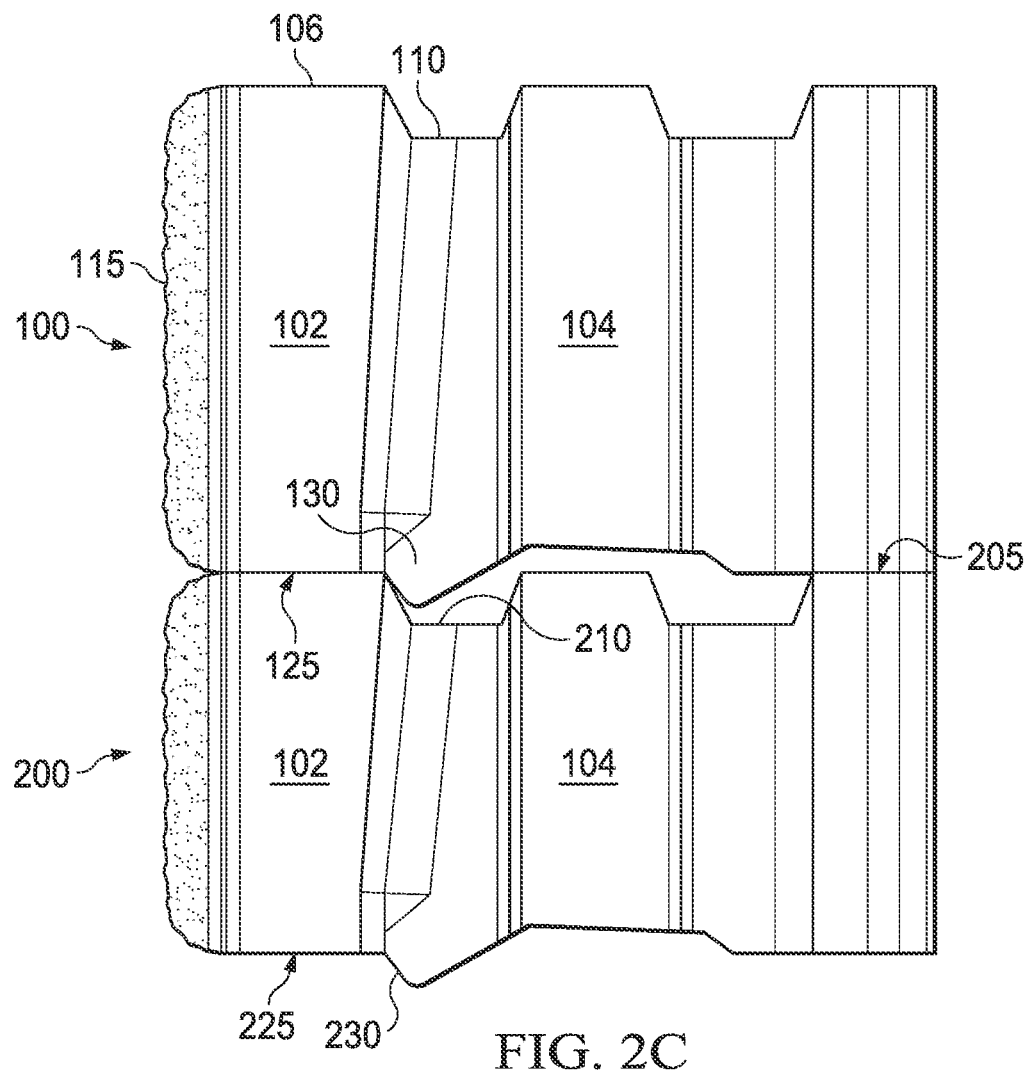

FIGS. 2A through 2C are diagrams of engaged retaining wall blocks 100 and 200, in accordance with an example embodiment of the present disclosure. As shown in FIG. 2A, retaining wall blocks 100 and 200 can have different sizes and can include top faces 106 and 206, respectively, engagement cavities 110 and 210, respectively, and textured front faces 115 and 215, respectively. As previously discussed, retaining wall blocks 100 and 200 also include false joints 120 and 220, as shown in FIGS. 2A and 2B. Likewise, other suitable false joints can also or alternatively be used.

In one embodiment of the present disclosure, first retaining wall block 100 is disposed onto a top surface 206 of a second retaining wall block 200. As shown in FIG. 2C, first retaining wall block 100 can positioned so that engagement protrusions 130 align with and fit into engagement cavity 210 of second retaining wall block 200. In one embodiment of the present disclosure, the angle and configuration of engagement notches 110 and 210 and engagement members 130 and 230 can be varied to allow the blocks 100, 200 to be assembled with an offset. In one example embodiment of the present disclosure, the angle of engagement notches 110 and 210 can be between about 30 degrees and about 90 degrees. Likewise, the angle of engagement members 130 and 230 can be between about 30 degrees and about 90 degrees.

Figure 3:
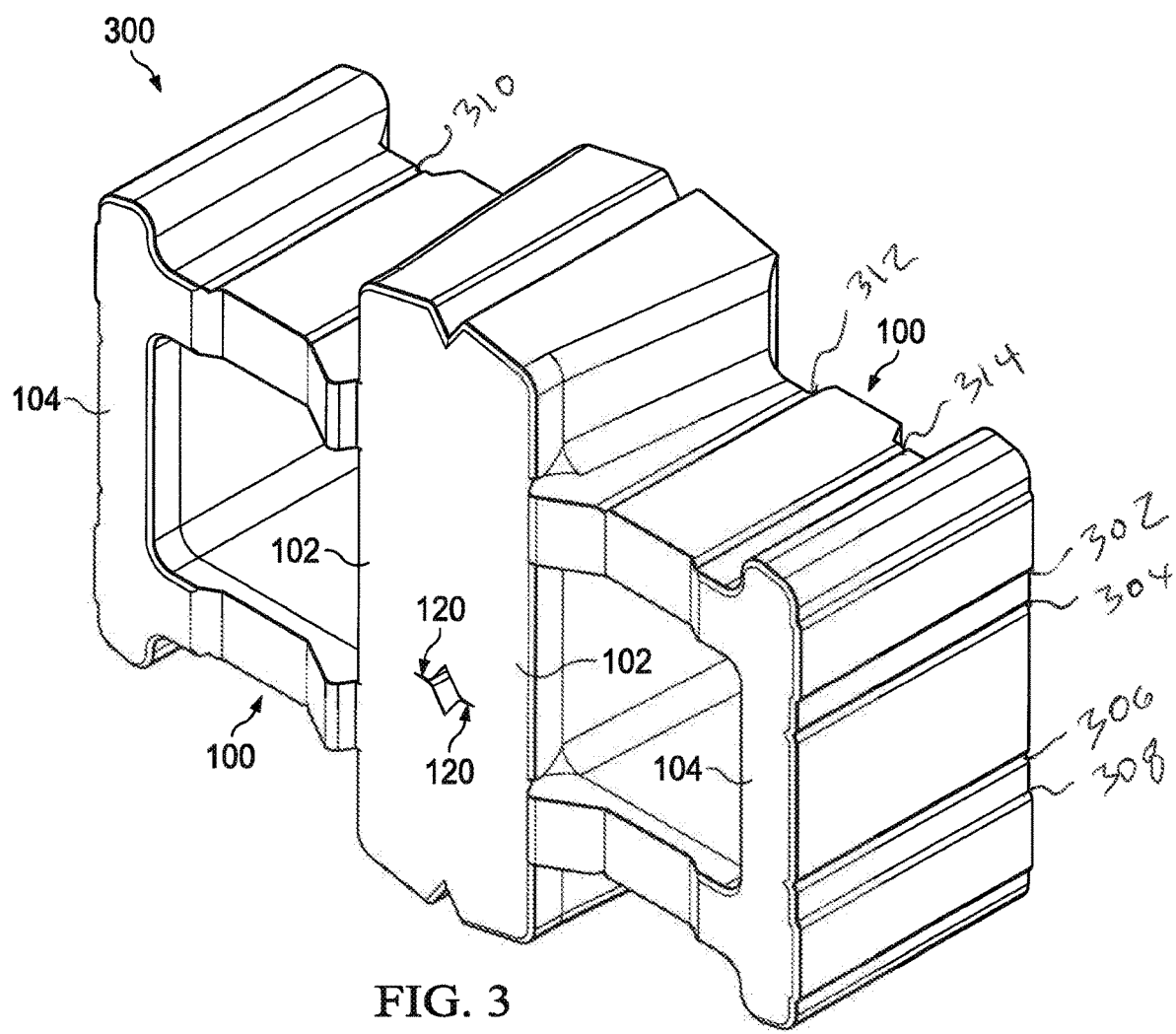
FIG. 3 is a diagram of molded retaining walls blocks with each having a false joint in accordance with an example embodiment of the present disclosure.

FIG. 3 is a diagram of a retaining wall block 300 with false joints 120 formed in the molded product, prior to splitting, in accordance with an example embodiment. Block 300 includes a first block having a body 102 and base 104 casted with a second block having a body 102 and base 104. The individual blocks 100 can be formed by splitting block 300 at the centerline, through the diamond shaped aperture segmenting the false joints 120. Retaining wall block includes indentations 302-312. The false joints 120 described herein can be cast within the mold at different suitable depths and at different suitable widths, and at varying suitable locations within body 102 corresponding to selected false joint locations.

Figure 1D:
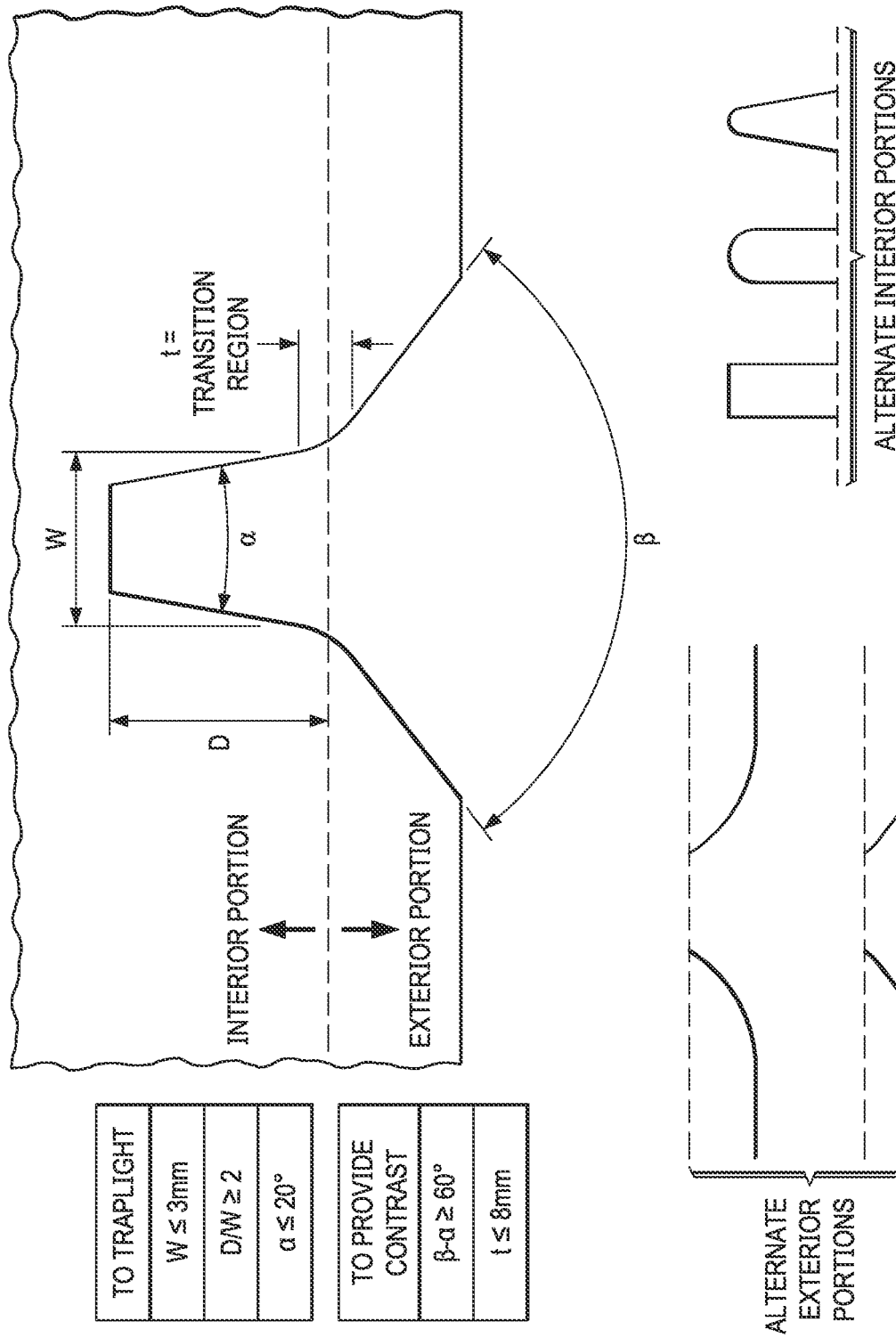
Figure 4:
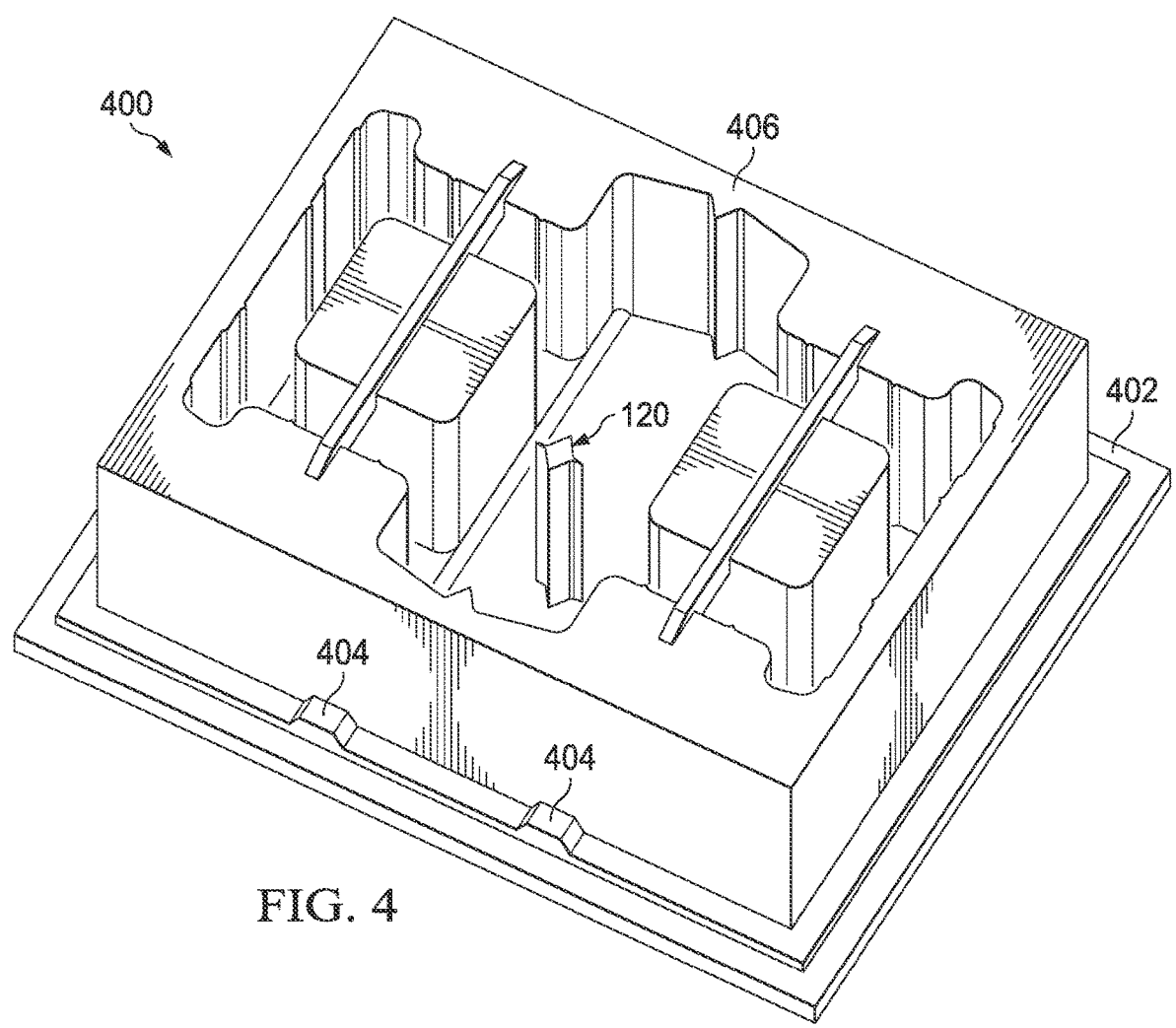
FIG. 4 is a diagram of a mold for providing a false joint, in accordance with an example embodiment of the present disclosure.

FIG. 4 is a diagram of a mold 400 for providing a false joint, in accordance with an example embodiment of the present disclosure. Mold 400 includes base 402, index notches 404, outer frame 406 and false joint 120 frame. When masonry compound or other suitable wet or dry mixes are added to the cavity of mold 400, false joint 120 frame creates a false joint feature, such as shown in FIG. 1D or other suitable false joints. After the block is formed by mold 400, mold 400 can be removed to allow the wet or dry mix to set and cure. False joint 120 frame can be coupled to mold 400 (not explicitly shown), or can be secured in another suitable manner to allow it to be withdrawn prior to setting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A masonry block comprising:
   a body defining an H-shaped structure having a front structure with a first surface and a second surface; and
   two middle structural members, at least one extending a predetermined distance between the second surface and a rear structural member, wherein at least one of the middle structural members includes an upper portion having a first angle, a lower portion having a second angle and a transition region wherein a distance between the upper portion and the lower portion reduces from a first value to a second value;
   wherein the first angle extends for a predetermined distance over the upper portion and wherein a depth of the upper portion of at least one of the middle structural members is equal to or less than a height of a protrusion of the lower portion of the at least one of the middle structural members, wherein the lower portion further comprises a third angle that is contiguous with the protrusion.

2. The masonry block of claim 1 wherein a depth of a notch of the upper portion of at least one of the middle structural members is equal to or less than a depth of a notch of the lower portion of the at least one of the middle structural members.

3. The masonry block of claim 1 wherein the upper portion further comprises a fourth angle and at least one middle structural member extends to an indentation.

4. The masonry block of claim 1 wherein the lower portion further comprises a fourth angle.

5. The masonry block of claim 1 wherein the lower portion is contiguous with the protrusion.

6. A retaining wall comprising:
   a first course of a plurality of first retaining wall blocks, each block comprising:
      a body defining an H-shaped structure having a front structure with a first surface and a second surface; and
      two middle structural members extending a predetermined distance between the second surface and a rear structural member, wherein the middle structural members each include an upper portion having a first angle, a lower portion having a second angle and a transition region wherein a distance between the upper portion and the lower portion reduces from a first value to a second value, wherein the first angle extends for a predetermined distance over the upper portion;
   a second course of the first retaining wall blocks above the first course;
   at least one second retaining wall block having a body with a front structure with a first surface and a second surface; and
   two middle structural members, at least one extending a predetermined distance between the second surface and a rear structural member, wherein a depth of the upper portion of at least one of the middle structural members of the first retaining wall blocks is equal to or less than a height of a protrusion of the lower portion of the at least one of the middle structural members of the first retaining wall blocks, and wherein the lower portion of the first retaining wall blocks further comprises a third angle that is contiguous with the protrusion.

7. The retaining wall of claim 6 wherein a depth of a notch of the upper portion of at least one of the middle structural members of the first retaining wall blocks is equal to or less than a depth of a notch of the lower portion of the at least one of the middle structural members of the first retaining wall blocks.

8. The retaining wall of claim 6 wherein the upper portion of the first retaining wall blocks further comprises a fourth angle.

9. The retaining wall of claim 6 wherein the lower portion of the first retaining wall blocks further comprises a fourth angle.

10. The retaining wall of claim 6 wherein the lower portion of the first retaining wall blocks is contiguous with the protrusion.

11. A retaining wall comprising:
a first course of a plurality of first retaining wall blocks, each block comprising:
   a body defining an H-shaped structure having a front structure with a first surface and a second surface; and
   two middle structural members extending a predetermined distance between the second surface and a rear structural member, wherein the middle structural members each include an upper portion having a first angle, a lower portion having a second angle and a transition region wherein a distance between the upper portion and the lower portion reduces from a first value to a second value, wherein the first angle extends for a predetermined distance over the upper portion;
a second course of the first retaining wall blocks above the first course;
at least one second retaining wall block having a body with a front structure with a first surface and a second surface; and
at least one middle structural member extending a predetermined distance between the second surface and a rear structural member of the second retaining wall block, wherein a depth of the upper portion of at least one of the middle structural members of the first retaining wall blocks is equal to or less than a height of a protrusion of the lower portion of the at least one of the middle structural members of the first retaining wall blocks, and wherein the lower portion of the first retaining wall blocks further comprises a third angle that is contiguous with the protrusion.

12. The retaining wall of claim 11 wherein a depth of a notch of the upper portion of at least one of the middle structural members of the first retaining wall blocks is equal to or less than a depth of a notch of the lower portion of the at least one of the middle structural members of the first retaining wall blocks.

13. The retaining wall of claim 11 wherein the upper portion of the first retaining wall blocks further comprises a third angle.

* * * * *